INVENTOR.
ROBERT RUBEN PERLMAN
BY
Abraham Friedman
Atty.

INVENTOR.
ROBERT RUBEN PERLMAN
BY
Abraham Friedman
Atty.

INVENTOR.
ROBERT RUBEN PERLMAN
BY
Abraham Friedman
Atty.

Jan. 27, 1959 R. R. PERLMAN 2,871,354

OSCILLATORS

Filed March 2, 1953 4 Sheets-Sheet 4

*INVENTOR.*

ROBERT RUBEN PERLMAN

*BY*

Abraham Friedman

Atty.

2,871,354

OSCILLATORS

Robert Ruben Perlman, New York, N. Y.

Application March 2, 1953, Serial No. 339,595

3 Claims. (Cl. 250—36)

This invention relates to oscillators, and more particularly to oscillators capable of generating a variety of sinusoidal and/or complex voltages, and is a continuation in part of my co-pending application Serial No. 259,986, filed December 5, 1951, in the United States Patent Office, now abandoned.

It is the prevailing practice, within the electronic industry, to utilize a voltage generator for a singular purpose. The saw-tooth oscillator is utilized to generate a saw-tooth potential; the sinusoidal oscillator to generate a sinusoidal potential; the pulse oscillator to generate a pulse potential; and so on for other complex potentials.

It is an object of the invention to provide an improved oscillator for use selectively as a predetermined wave generator, modulator source, converter, or selective control actuator.

It is a further object of the invention to provide an improved oscillator which may be utilized for the improvement of communication equipment, radar equipment, and a variety of other equipment utilizing oscillators as a basic component segment thereof.

It is another object of the invention to provide an oscillator capable of generating, by the selective use of variable components, sinusoidal and/or complex potentials at the option of an operator.

It is a further object of the invention to provide an improved oscillator utilizing a basic principal of operation, but wherein the circuitry may be readily varied to meet the particular needs of associate equipment.

It is another object of the invention to provide a new and improved oscillator which has wide utilitarian value and is economical to manufacture.

It is a further object of the invention to provide improved circuitry for oscillators which may successfully be employed with transistors.

Other objects and advantages of the invention will be apparent to those skilled in the art, from a reading of the accompanying specification, taken with the drawing, wherein.

Figure 1:
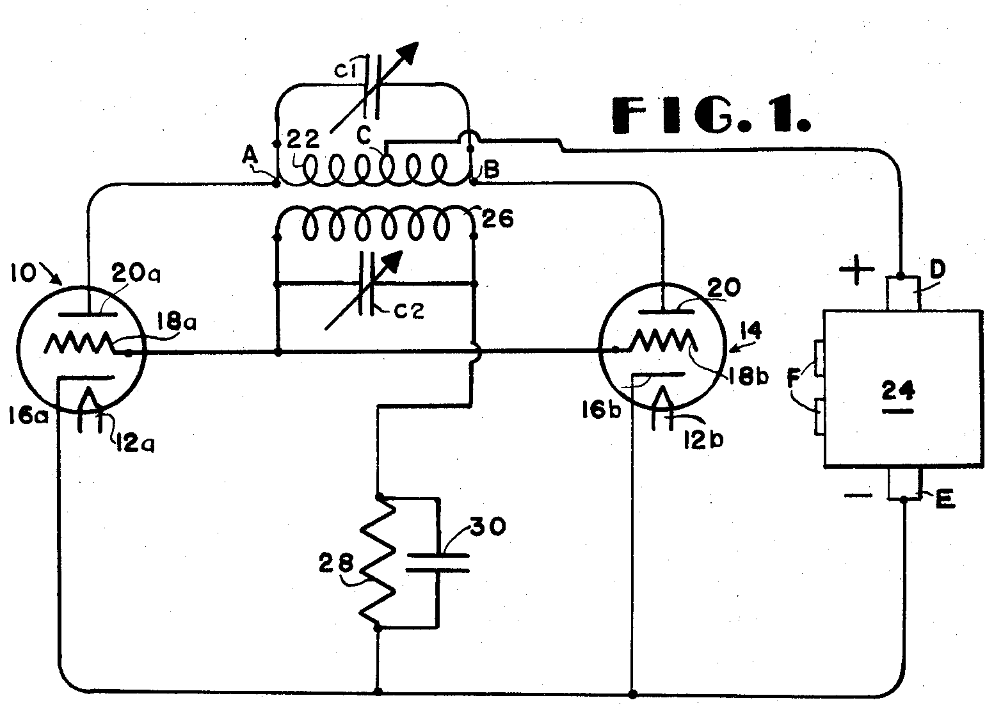
Figure 1 is the circuitry of an oscillator embodying the invention.

Referring to the drawings in detail, and more particularly to Figure 1 thereof, the invention includes a first electron tube 10 and a second electron tube 14. The electron tubes 10 and 14 may be formed in a unitary envelope or may at the option of the constructor or utilizer be formed as distinct and separate electron tubes, each including therein a cathode **16*a* and 16*b* respectively, a grid 18*a* and 18*b* respectively, an anode 20*a* and 20*b* respectively, and heaters 12*a* and 12*b*** respectively.

In the circuit of Figure 1, the anodes **20*a* and 20*b* are electrically connected to opposedly formed extremities of an inductance 22, as at points "A" and "B" respectively. Inductance 22 is further provided with a center tap "C" which is in turn electrically connected to a point "D" of a suitable power supply unit 24, which is the positive terminal of said power supply unit and places a positive potential upon said anodes 20*a* and 20*b***. It is obvious from a study of the circuit of Figure 1 that the connection described place the anodes at 180° phase difference for alternating currents generated in the inductance, during the period of time that the oscillator is in operation.

The grids **18*a* and 18*b* of the electron tubes 10 and 14 respectively are electrically connected one to the other and thus have a zero potential difference therebetween, and are further connected to one extremity of an inductance 26, the other extremity of said inductance 26 being electrically connected to a negative source of potential of power supply unit 24 through a grid leak resistor 28, as at point "E." The grid leak resistor is shunted electrically by a capacitor 30** of suitable value to assure the desired oscillatory characteristics of the circuit.

The cathodes **16*a* and 16*b* of the respective electron tubes are both electrically connected to the negative source of potential as at point "E" of the power supply unit 24**.

The heaters of filaments **12*a* and 12*b* of the respective electron tubes 10 and 14 are connected to points "F" of power supply unit 24**, and obtain the required heater power therefrom.

In retrospect, the circuit embodying the invention, comprises the parallel connection of the grids and cathodes of electron tubes 10 and 14, and the push pull or out of phase connection of the anodes of said tubes. Although the circuit of Figure 1 thus illustrates triodes as the electron tubes utilized, I desire it understood that multi electrode tubes such as tetrodes and pentodes may likewise be utilized by connecting the control, emitter and collector electrodes, without departing from the principle of the invention. The circuit is further adapted to use by the transistors as will be more fully set forth herein with reference to Figures 5 and 6.

In operation, the oscillator functions in the following manner:

As the electron tubes 10 and 14 approach operating temperature, and a positive potential is applied to the anodes **20*a* and 20*b* respective the cathodes 16*a* and 16*b***, a current is caused to flow between the cathodes and respective anodes of the particular electron tubes.

A circulating current is initiated in the resonant circuit of inductance 22, the frequency and Q whereof would be determined by the particular value of inductance and capacitance utilized, causing the anodes of the respective tubes to be at different potentials, and further causing the anode at the higher alternating current potential to draw the larger current. With the cathode-anode currents being of unequal value, the currents flowing through inductance 22, although in opposing directions, have a resultant magnetic field generated about inductance 22 of sufficient magnitude and of proper phase to drive the grids of electron tubes 10 and 14 to a positive potential with respect to the cathodes of the tubes via the potential induced across inductance 26 which is coupled closely with respect to inductance 22.

Placement of a positive potential upon the grids **18*a*** and 18b of tubes 10 and 14 respectively, and with respect to the cathodes within the tubes, causes the grids to draw current, and in turn establishes an electrical charge across capacitor 30, which is electrically connected in the circuit between the grids and the cathodes.

The electric charge developed across capacitor 30 is of extremely short duration and places the grids at a negative potential with respect to the cathode, until such time as the capacitor sufficiently discharges through resistor 28 which is in parallel electrical connection with capacitor 30.

During the period of time that the grids are biased to a potential beyond the cut-off potential of the tubes under the then operating characteristics, an oscillatory current flows within the inductance 22 and a further current within inductance 26, which may optionally be shunted by capacitors C1 and C2 respectively. If the RC time constant of capacitor 30 and grid-leak resistor 28 are made long, the output potential will have a damped characertistic. Blocking oscillations, resulting in a large variety of non-sinusoidal potentials may be obtained by placement of a large capacitor across the inductance 22. Distortion of the oscillation may be further obtained at the option of the operator, by varying the value of the grid-leak resistor 28 and the capacitor 30 to effect a difference in RC time constant for those two elements.

In the circuit of Figure 1, it is not necessary that the resonant frequency of both inductances 22 and 26 be approximately the same. The differences in resonant frequencies of the two inductances further affect the wave shape of the resultant potential generated by the oscillator. It is further obvious that with the grid electrodes 18a and 18b both at the same potential, and the anodes 20a and 20b at substantially 180° phase difference due to connection at opposite extremities of an inductance, one of said anodes will draw a large current and the other little or no current, again providing an element capable of affecting the output potential wave form.

Figure 2:
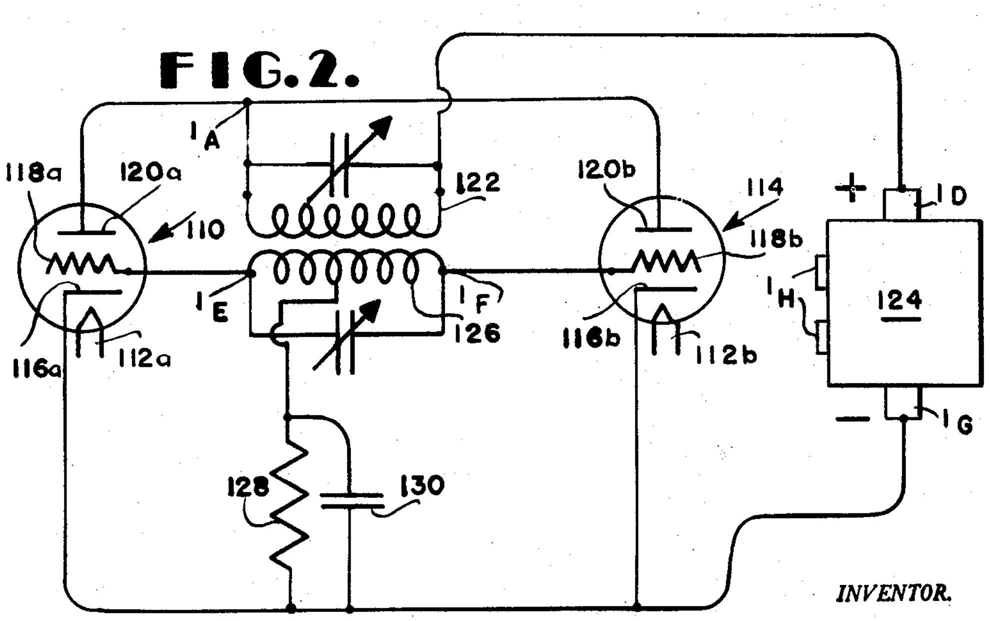
Figure 2 is a modified circuit showing an oscillator embodying the invention.

An alternate circuit embodying the invention is illustrated within Figure 2 of the drawing, wherein two electron tubes 110 and 114 each include a heater 112a and 112b respectively, a cathode 116a and 116b respectively, a grid 118a and 118b respectively, and an anode 120a and 120b respectively. An examination of the circuit will indicate that the anodes 120a and 120b are electrically connected in parallel, while the grids 118a and 118b are connected in a push-pull arrangement, or with the grid electrodes 180° out of phase relative one another.

In detail, referring to Figure 2, the anodes 120a and 120b are connected electrically one to the other and to one extremity of an inductance 122,, as at point "1A," the other extremity of said inductance 122 being connected elecrically to a positive point of a direct current potential as at a point "1D" of a power supply unit 124.

The grids 118a and 118b of electron tubes 110 and 112 are electrically connected at opposite extremities of a center tapped inductance 126, as at points "1E" and "1F" respectively. The center tap of said inductance 126 is electrically connected to a grid-leak resistor 128 and therethrough to the negative terminal "1G" of power supply unit 124. Grid-leak resistor 128 is shunted by a grid capacitor 130, which as was indicated with respect to the description of the operation of the circuit of Figure 1, is a control factor with respect to the characteristics of our oscillator.

The cathodes 116a and 116b are electrically connected to the negative terminal "1G" of the power supply unit 124, and the heaters for the electron tubes 110 and 114, designated as 112a and 112b, are electrically connected to points "1H" of power supply unit 124, and obtain the required heater power therefrom.

In operation of the circuit of Figure 2, let us assume that electron tube 110 will operate with a positive feedback and electron tube 114 with a negative feedback. Considering that the grid voltage-plate current characteristics of both tubes are non-linear and exponential, the curvature of the characteristic grid voltage-plate current curve as for electron tube 110 will be accentuated, and the curvature of the characteristic grid voltage-plate current curve as for electron tube 114 will be reduced. Electron tube 110 therefore has higher gain than tube 114 due to the feedback relationship. The plate current or anode current through the tubes remain unchanged until such time as an electronic disturbance affects the grid voltages of electron tubes 110 and 114. The disturbance thus created increases the anode current until such time as the inductance 122 becomes an oscillatory circuit. It is obvious that as tube 110 is driven positive the anode potential rises above the direct current supply voltage. Simultaneously the grid of tube 114 is negative and the alternating current potential applied to the anode of said tube is at a lower potential than the direct current power supply potential. Conversely on the alternative half cycle the potentials on the tubes are reversed. The difference in potential existing between the anodes of the tubes 110 and 114 produces a corresponding difference in anode current and supplies sufficient energy to the tank circuit for maintaining oscillation. The grid-leak resistor 128 and condenser 130 perform the same function as their counterparts resistor 28 and condenser 30 of Figure 1.

Figure 3:
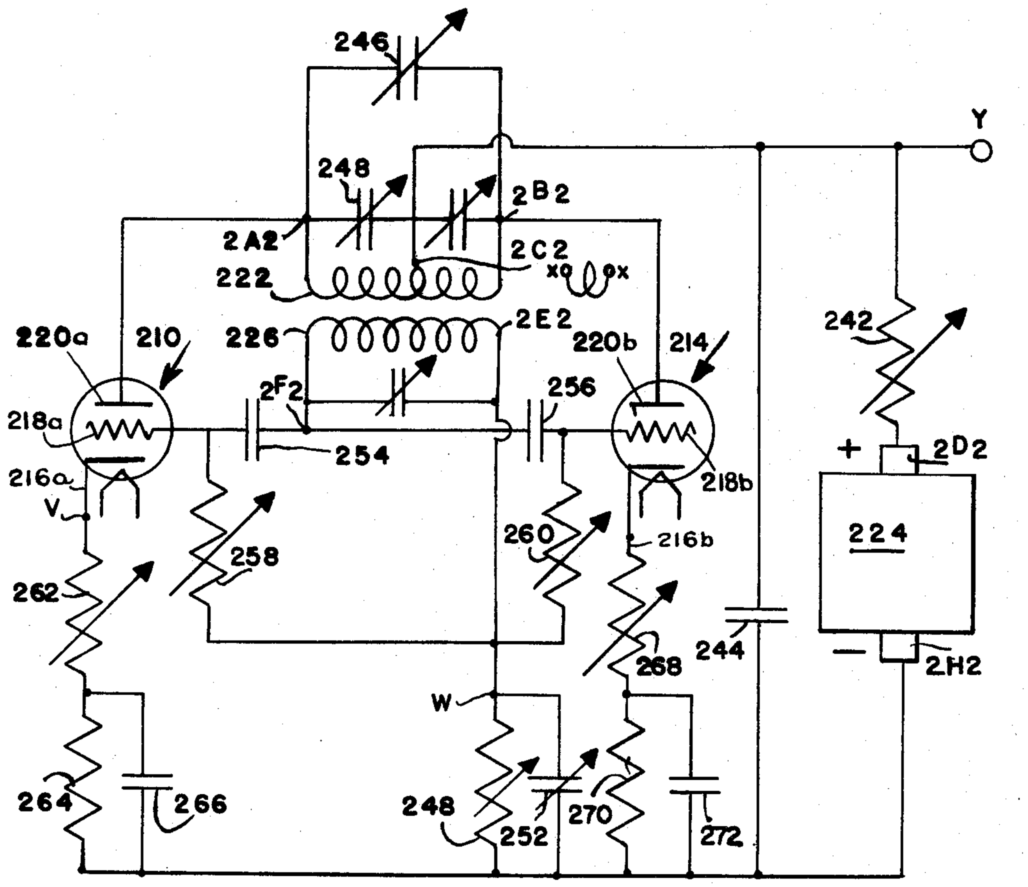
Figure 3 is a further modified circuit showing an oscillator embodying the invention.

A further alternate of the circuit of Figure 1, including variable adjustments for changing the wave shapes of a generated potential is shown in Figure 3. Referring to the drawing in detail, the circuit comprises a pair of electron tubes 210 and 214, each respectively being provided with grids 218a and 218b and anodes 220a and 220b.

The electron tubes 210 and 214 are electrically connected so that the anodes 220a and 220b are connected at opposite extremities of an inductance 222 as at points "2A2" and "2B2" respectively. The inductance 222 is further provided with a center tap "2C2" which is in turn connected to a variable resistor 242, and therethrough to the positive terminal "2D2" of a power supply unit 224. A by-pass capacitor 244 has one extremity thereof electrically connected between the junction of center tap "2C2" and resistor 242, and the other extremity thereof connected to point "2H2" or the negative terminal of power supply unit 224. Inductance 222 is further shunted by a capacitor 246 extending between the extremities of the inductance, and further shunted by a split stator capacitor 248 the rotor whereof may be connected to center tap "2C2" and the stators whereof may be connected one each to the extremities of the inductance 222.

Coupled inductively to capacitive and inductive circuit of the anodes is an inductance 226, one extremity whereof, "2E2" is electrically connected to a variable resistor 248 and therethrough to the negative terminal "2H2" of power supply 224. The variable resistor 248 is shunted by a variable capacitor 252, and the other extremity of said inductance 226, or point "2F2" is electrically connected to grid 218a via capacitor 254 and to grid 218b via capacitor 256. Grid 218a is further connected to a variable grid-leak resistor 258 the other extremity whereof is connected to point "2E2" of inductance 226. Grid 218b is similarly connected to a variable resistor 260, the other extremity whereof is connected to point 2E2 of inductance 226.

Cathode 216a is connected to one extremity of a variable resistor 262 the other extremity whereof is connected to a fixed resistor 264. The other extremity of resistor 264 is electrically connected to point "2H2" of power supply unit 226. Resistor 264 is further shunted by a capacitor 266. Cathode 216b is similarly connected to one extremity of a variable resistor 268, the other extremity whereof is connected to a fixed resistor 270, the other extremity of said resistor 270 being connected electrically to point "2H2" of power supply unit 226. Resistor 270 is further shunted by a capacitor 272.

Output may be obtained from the oscillator at points designated as "X" for low frequencies, "Y" designated for high frequency potentials modulated by low frequency potentials. Input points for the insertion of possible modifying signals or the like are designated as "V" and "W."

Typical components for the circuit of Figure 3 for operation as a complex wave generator would include:

| | | |
|---|---|---|
| Electron tubes **210** and **214** | Type | 6AB4 |
| Resistors **262** and **268** | ohms | 200 |
| Resistors **264** and **270** | do | 150 |
| Capacitors **266** and **272** | mmfd | .001 |
| Resistors **258** and **260** | megohms | 1 |
| Capacitors **254** and **256** | mmfd | .001 |

In operation, the circuit of Figure 3 basically performs in the same manner as set forth with respect to the circuit of Figure 1.

Figure 4:
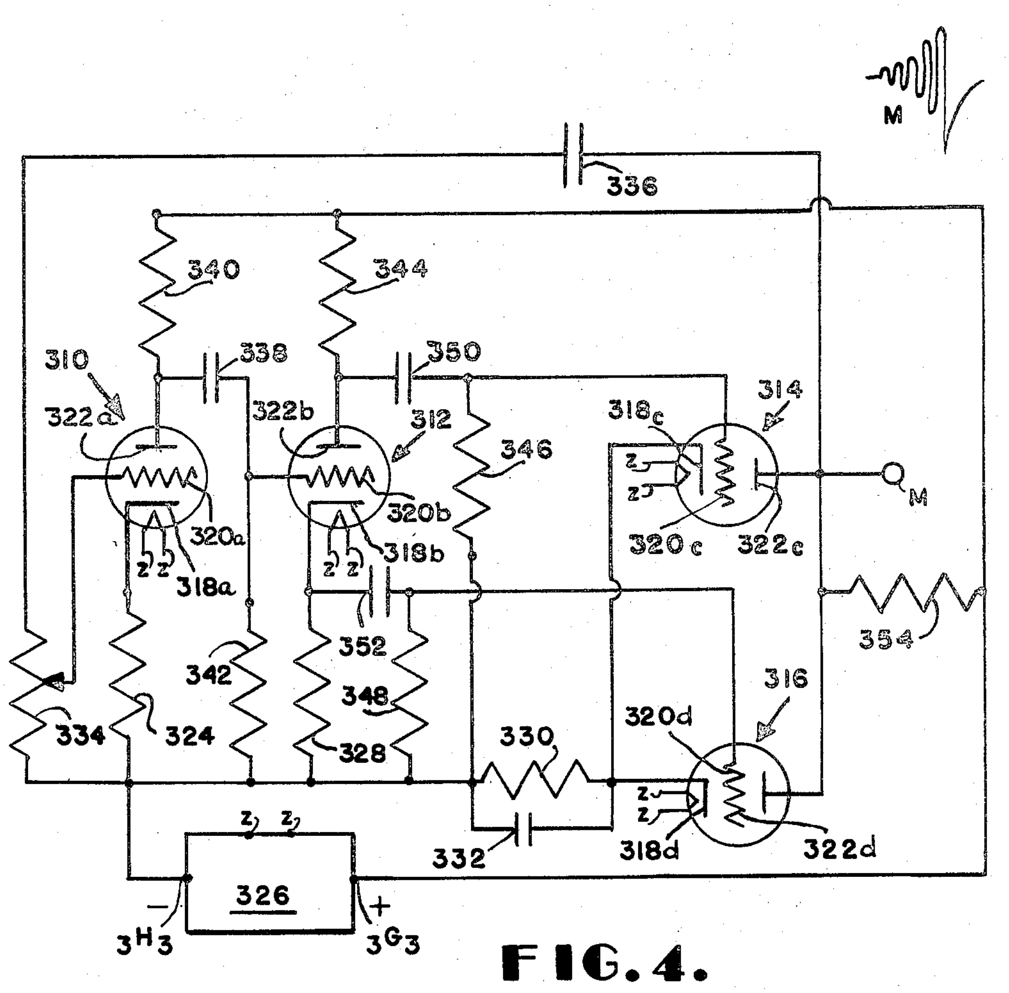
Figure 4 is another modified circuit showing an oscillator embodying the invention.

Another circuit embodying the invention is shown in Figure 4, wherein resistive and capacitive components are utilized in preference to inductive and capacitive circuits although capacitive and inductive tuned circuits could be substituted in the anode and grid circuits of the circuit.

Referring to Figure 4 in detail, the circuit includes electron tubes 310, 312, 314 and 316, each including a cathode **318*a*, 318*b*, 318*c* and 318*d* respectively. Each tube further includes a grid 320*a*, 320*b*, 320*c* and 320*d*, and an anode 322*a*, 322*b*, 322*c* and 322*d***.

Cathode **318*a* is connected to the negative terminal "3H3" of power supply unit 326 through a fixed resistor 324; a cathode 318*b* to terminal "3H3" through a fixed resistor 328; and cathodes 318*c* and 318*d* in parallel to terminal "3H3" of power supply unit through resistor 330, said resistor 330 being bypassed by a capacitor 332**.

Grid **320*a* is connected to the variable arm of a variable resistor 334, one extremity whereof is electrically connected to terminal "3H3," the negative terminal of power supply unit 330, and the other extremity whereof is connected to anodes 322*c* and 322*d* via a capacitor 336**.

Anode **322*a* is coupled to grid 320*b* by means of a capacitor 338, and obtains a positive potential thereon through a resistor 340 the other extremity whereof is connected to terminal "3G3" or the positive terminal of power supply unit 330. Grid 320*b* is further connected to cathode 318*b* through a resistor 342. Anode 322*b* obtains a positive potential thereon through a resistor 344, the other extremity whereof is connected to "3G3" of power supply unit 326**.

Electron tube 312 acts as a phase inverter unit, output therefrom being obtained at the cathode and plate or anode. The plate or anode of tube 312, is coupled to grid **320*c* and the cathode of tube 312, is coupled to grid 320*d*, thus supplying the grids of tubes 314 and 316** with grid voltages which are 180° out of phase with one another.

Grid **320*c* is further connected electrically to terminal "3H3" through a resistor 346, the grid 320*d* being similarly connected to terminal "3H3" through a resistor 348. Coupling to the grids from tube 312 is accomplished through coupling capacitors 350 and 352** respectively.

Anodes **322*c* and 322*d*, connected in parallel, obtain a positive potential from terminal "3G3" via resistor 354**.

Typical values for the components of the circuit are as follows:

| | |
|---|---|
| Electron tubes **310, 312, 314** and **316** | 6SN7. |
| Resistor **326** | 1 megohm pot. |
| Resistors **340** and **344** and **318*b*** | 100,000 ohms. |
| Resistors **346** and **348** | 500,000 ohms. |
| Resistor **326** | 2200 ohms. |
| Resistor **342** | 3 megohms. |
| Resistor **330** | 330 ohms. |
| Resistor **354** | 5000 ohms. |
| Capacitors **338, 350, 352** and **336** | .5 mfd. |
| Capacitor **332** | .0001 mfd. |

The characteristics of the wave generated by this oscillator is illustrated at point "M."

Operation of the circuit of Figure 4 is generally similar to that of the circuit of Figure 2. Tube 310 is an amplifier tube, tube 312 a phase inverter, and tubes 314 and 316 incorporate the features of parallel anode connections with opposing grid connections.

Figure 5:
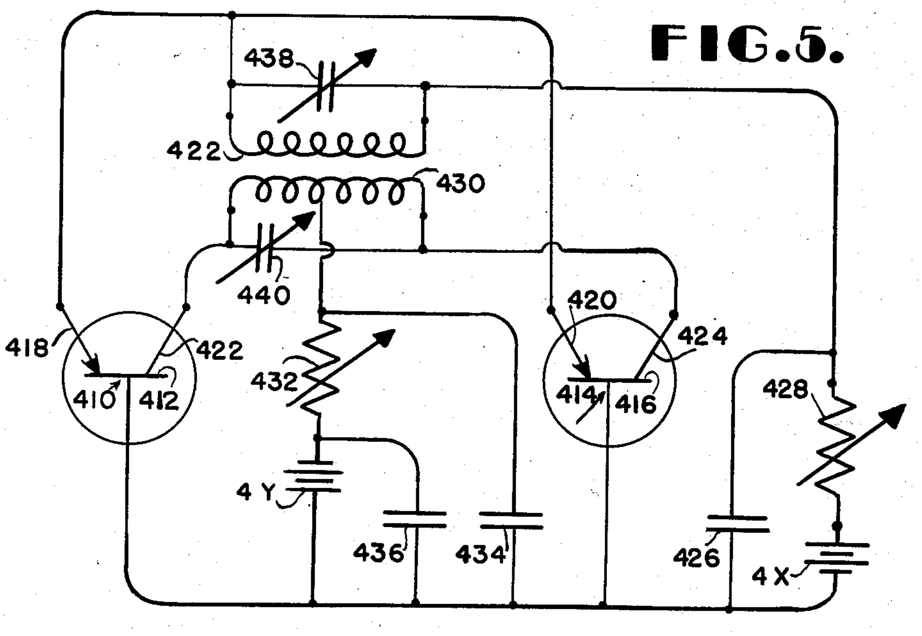
Figure 5 is an alternate circuit embodying the principle of the invention, and wherein the novel transistors are utilized in place and stead of the electron tubes illustrated in Figures 1, 2, 3, and 4.

Referring to the drawing of Figure 5, a circuit is shown embodying a pair of transistors 410 and 414 of the point contact, junction or other amplifying types. The transistors comprise bases 412 and 416, respectively, emitters 418 and 420 and collectors 422 and 424 respectively. The transistors are electrically connected in a circuit similar to that utilized for the vacuum tubes. For example, the bases 412 and 416 are directly interconnected. The emitters 418 and 420 are electrically connected together and to one extremity of an inductance 422. The other extremity of said inductance 422 is connected to the junction of a capacitor 426 and a variable resistor 428. The other terminus of the capacitor is connected electrically to the bases 412 and 416. The other terminus of the variable resistor 428 is connected to the bases 412 and 416 through a battery or source of potential 4X. The collectors are connected electrically to opposite terminals of a tapped inductance 430. The tap is connected to the common terminal of a variable resistor 432 and a capacitor 434. The other extremity of capacitor 434 is connected to the bases 412 and 416. The other terminus of resistor 432 is electrically connected to the bases through a battery 4Y. The battery 4Y may be suitably shunted by capacitor 436.

For the purposes of tuning the resonant frequency of the inductance 422 a capacitor 438 of suitable capacitance is shunted across the inductance 422. Similarly, a suitable capacitor 440 is shunted across the inductance 430. As may readily be seen, inductance 422 and 430 are coupled one to the other.

In operation the circuit operates in a manner similar to the circuit described in Figure 1.

In an experimental circuit as shown in Figure 4 and utilizing the transistors therein a list of components are as follows:

| | |
|---|---|
| Transistors **410** and **414** | W. E. 1698, contact transistors. |
| Variable resistor **428** | 3500 ohms. |
| Variable resistor **432** | 14,000 ohms. |
| Battery **4Y** | 45 volts. |
| Battery 4X | 1.5 volts. |
| Capacitors **426** and **434** | R. F. bypass. |

Figure 6:
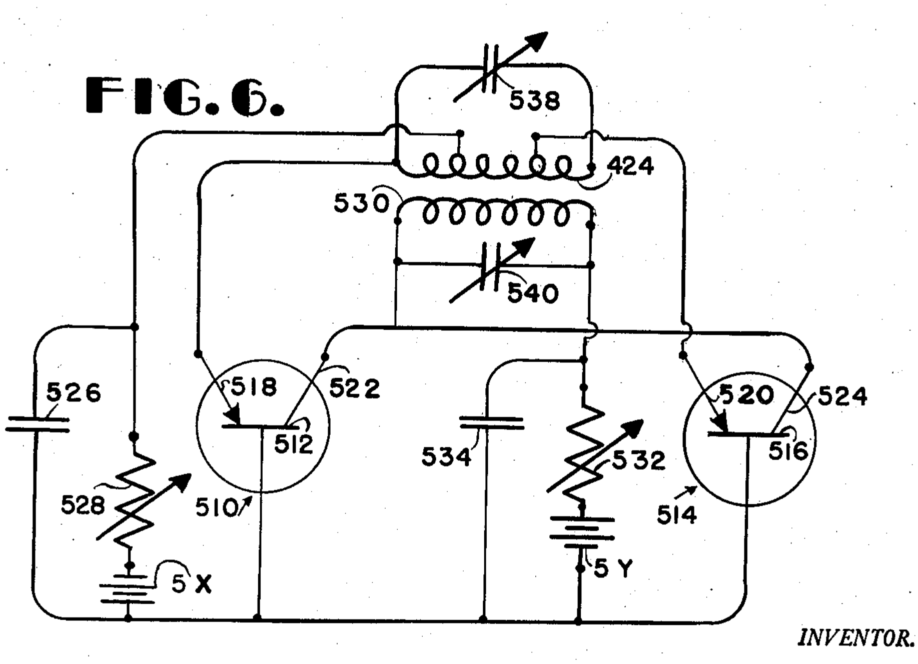
Figure 6 is a further alternate circuit embodying the principle of the invention, and wherein transistors are utilized in place and stead of the electron tubes illustrated in Figures 1, 2, 3, and 4.

Referring to Figure 6 a pair of transistors 510 and 514 are shown in an alternate circuit embodying the invention. The bases 512 and 516 are connected one to the other. The emitters 518 and 520 are connected to an inductance 424 so that said emitters are 180° out of phase with one respective the other. The inductance is further tapped between the points at which said emitters are connected and the tap is electrically connected to a junction formed by one terminal of a capacitor 526 and a variable resistor 528. The other extremity of capacitor 526 is electrically connected to the bases 512 and 516. The other extremity of resistor 528 is connected to the bases 412 and 416 through a suitable battery 5X.

The collectors 522 and 524 of the transistors are electrically connected together and to one extremity of an inductance 530. The other extremity of said inductance 530 is electrically connected to the junction formed by one extremity of a capacitor 534 and a variable resistor 532. The other extremity of said capacitor 534 is electrically connected to the bases and the other extremity of the variable resistor 532 is electrically connected to the bases through a suitable battery or other source of potential 5Y. The inductance 524 may be shunted by a suitable capacitor such as 538 for the purpose of varying the resonant frequency of the combination and similarly inductance 530 is shunted by a suitable capacitor 540 which permits variation of the resonant frequency of said combination.

Operation of this circuit is similar to that of the circuit of Figure 2. Inductances 524 and 530 are coupled one to the other.

In an experimental circuit as shown in Figure 6 and utilizing the transistors therein a list of components are as follows:

| | |
|---|---|
| Transistors **510** and **514** | W. E. 1698 point contact transistors. |
| Variable resistor **428** | 3500 ohms. |
| Variable resistor **432** | 14,000 ohms. |
| Battery 4Y | 45 volts. |
| Battery 4X | 1.5 volts. |
| Capacitors **426** and **434** | R. F. bypass. |

It is obvious that transistors or vacuum tubes may be utilized with the basic circuits of the invention.

Although I have shown my invention as embodying resistive coupling as in Figure 4, I desire it understood that transformer coupling could be substituted as between tubes 310 and 312 and the like, and that although I have given illustrative values of components for the circuits illustrated in Figures 3 and 4, that the same may be varied within wide latitudes to provide different wave shapes for the potentials generated, and that the essence of my invention resides in the novel and improved circuitry. It is therefore my intention that the appended claims be read in the light and scope of the present invention.

I claim:

1. An oscillatory wave generator including a pair of electron devices, each of said electron devices including a control electrode and a collector electrode, electrical connections to said control electrodes and to said collector electrodes forming means to sustain oscillations, said means to sustain oscillations including a first inductance and a second inductance inductively coupled one to the other, said electrical connections to said collector electrodes including electrical connection to said collector electrodes placing said collector electrodes in parallel one respective the other, and said collector electrodes connected to said second inductance, and said electrical connections to said control electrodes including electrical connections from said control electrodes to said first inductance, said electrical connections to said first inductance placing said control electrodes out of phase one respective the other.

2. An oscillatory wave generator including a pair of electron tubes, each of said electron tubes including a grid electrode and an anode, electrical connections to said grids and said anodes forming means to sustain oscillations, said means to sustain oscillations including a first inductance and a second inductance inductively coupled one to the other, said electrical connections to said anodes including electrical connections to said anodes placing said anodes in parallel one respective the other, and said anodes connected to said second inductance, and said electrical connections to said grids including electrical connections from said grids to said first inductance placing said grids out of phase one respective the other.

3. An oscillatory wave generator including a pair of electron transistors, each of said transistors including an emitter and a collector, electrical connections to said emitters and collectors forming means to sustain oscillations, said means to sustain oscillations including a first inductance and a second inductance inductively coupled one to the other, said electrical connections to said collectors including electrical connections to said collectors placing said collectors in parallel one respective the other, and said collectors electrically connected to said second inductance, and said electrical connections to said emitters including electrical connections from said emitters to said first inductance placing said emitters out of phase one respective the other.

References Cited in the file of this patent

UNITED STATES PATENTS

| | | |
|---|---|---|
| 1,966,616 | David | July 17, 1934 |
| 2,063,248 | Hansell | Dec. 8, 1936 |
| 2,190,731 | Posthumus | Feb. 20, 1940 |
| 2,533,032 | Montcalm | Dec. 5, 1950 |